Jan. 30, 1951     H. K. WEISS     2,539,501
MEANS FOR AUTOMATICALLY DETERMINING THE ANGLE OF
APPARENT CLIMB OR DIVE OF A TARGET

Filed April 9, 1946     5 Sheets-Sheet 1

Inventor
HERBERT K WEISS

By J. H. Church + H. E. Thibodeau
Attorney

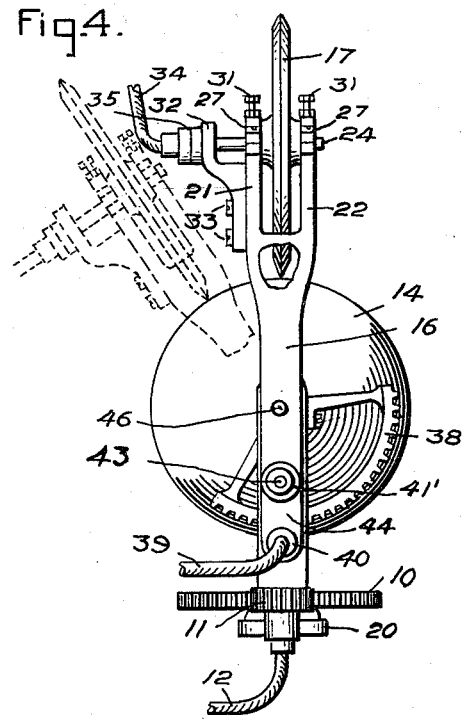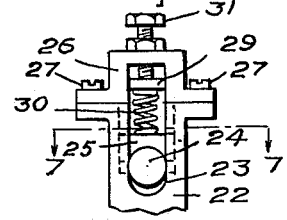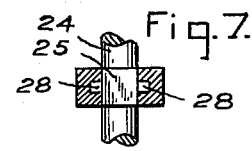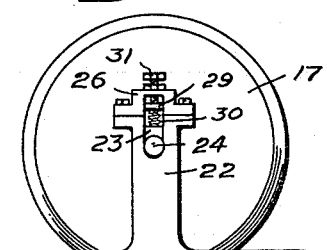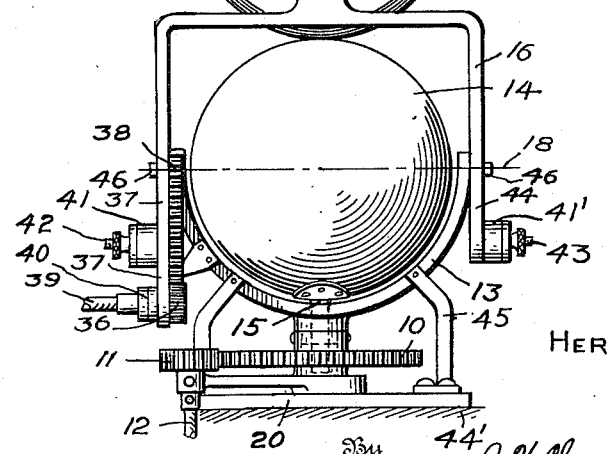

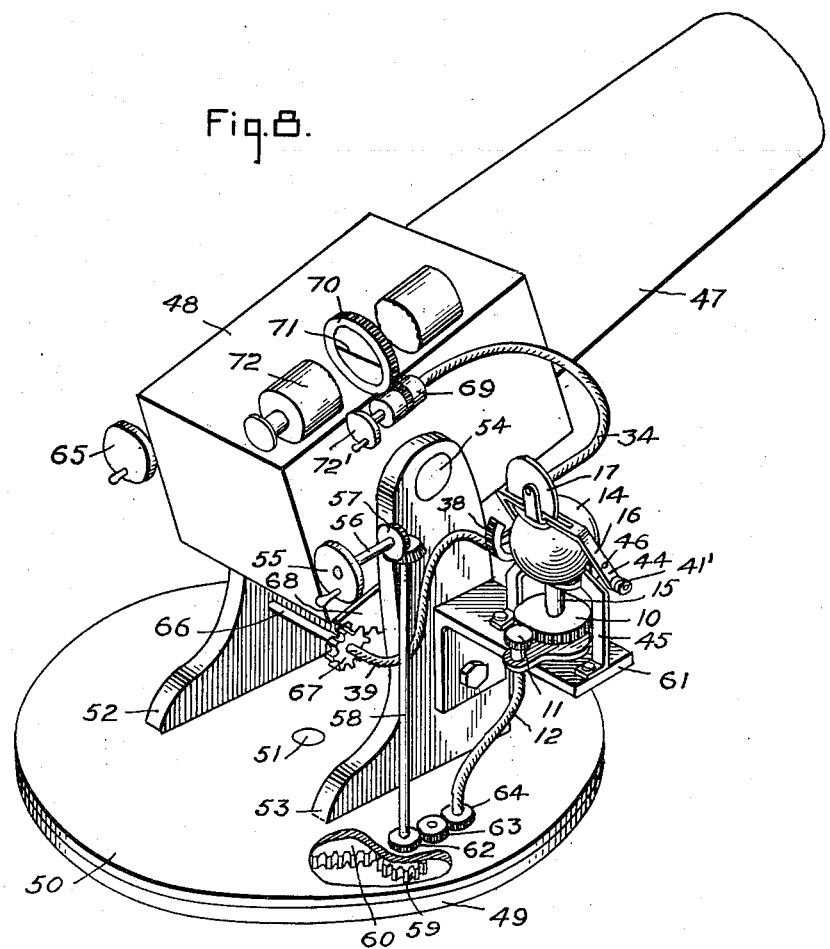

Jan. 30, 1951 H. K. WEISS 2,539,501
MEANS FOR AUTOMATICALLY DETERMINING THE ANGLE OF
APPARENT CLIMB OR DIVE OF A TARGET

Filed April 9, 1946 5 Sheets-Sheet 4

Inventor
HERBERT K. WEISS

By J. H. Church & H. E. Thibodeau
Attorney

Jan. 30, 1951  H. K. WEISS  2,539,501
MEANS FOR AUTOMATICALLY DETERMINING THE ANGLE OF
APPARENT CLIMB OR DIVE OF A TARGET
Filed April 9, 1946  5 Sheets-Sheet 5

Inventor
HERBERT K. WEISS

By J. H. Church & H. E. Thibodeau
Attorney

Patented Jan. 30, 1951

2,539,501

UNITED STATES PATENT OFFICE 2,539,501

MEANS FOR AUTOMATICALLY DETERMINING THE ANGLE OF APPARENT CLIMB OR DIVE OF A TARGET

Herbert K. Weiss, Aberdeen, Md.

Application April 9, 1946, Serial No. 660,608

12 Claims. (Cl. 33—49)

(Granted under the act of March 3, 1883, as amended April 30, 1928; 370 O. G. 757)

The invention described herein may be manufactured and used by or for the Government for governmental purposes, without the payment to me of any royalty thereon.

With certain types of directors or computers used to compute the angle by which a gun should lead the gun-target line, a sighting reticle is provided that is rotatable in a plane perpendicular to the gun-target line. During an engagement, it is required to keep this reticle parallel to the apparent path of the target in order that the director may supply correct angular output values of lead.

Assume that the path of the craft is extended indefinitely on both sides of the gun, and that a line is extended from the gun normal to and intersecting said path, extended if necessary, at a point commonly known as the "cross-over" point. This point divides the path into a so-called "incoming leg" on the side from which the target approaches, and an "outgoing leg" on the side on which the target departs. On the incoming leg, the target as viewed from the gun, appears to be climbing, while on the outgoing leg, it appears to be diving. Only at the aforesaid dividing point does its path appear to be truly horizontal. Furthermore, the rate of apparent climb or dive constantly changes.

In order to simplify operation of the aforesaid type of directors, it is highly desirable that the reticle be rotated substantially automatically, to remain parallel to the apparent path of the target.

It is therefore a purpose of the invention to provide a mechanism connected with such a reticle so as to automatically rotate the same at the proper rate necessary to maintain the reticle parallel to the apparent path of the target.

A further object is to provide a mechanism of the type mentioned in the preceding paragraph, in which the movements of the gun itself as it is trained and elevated to continuously engage the target, are combined and utilized to actuate the reticle in the proper manner.

Other objects and advantages will become apparent as the description proceeds.

In the drawings:

Figure 4 is an elevation of one species of the mechanism for materializing the basic equation upon which the invention depends for operation.

Figure 5 is a elevation of the same species in a plane at right angles to the plane of Figure 4.

Figure 6 is an enlarged detail view of the resilient mounting of the planimeter-type wheel used to determine and transmit motion to the reticle.

Figure 7 is an enlarged sectional detail view taken upon a plane indicated by the line 7—7 Figure 6.

Figure 8 is a perspective simplified view showing the manner in which the instrument of Figures 4 and 5 may be associated with a gun.

Figure 1:
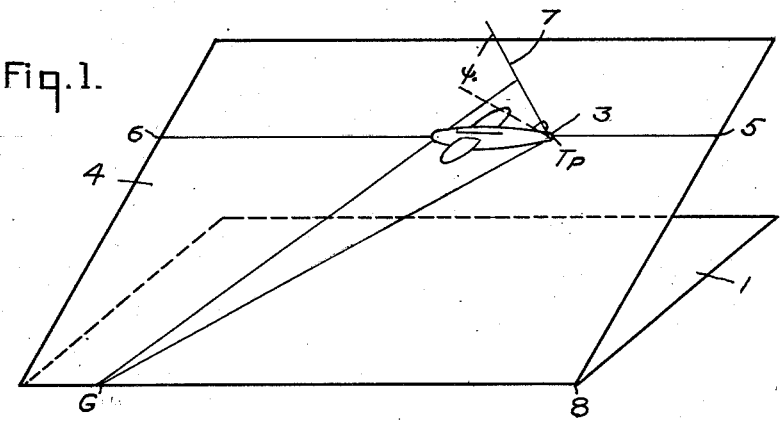
Figure 1 is a perspective view illustrating the optical illusion referred to in the preceding paragraphs.

Referring to Figure 1, the numeral 1 identifies a horizontal plane through a tracking point or gun station G, while the slant plane determined by the path 5—6 of the target and point G, is identified by the numeral 4. Planes 1 and 4 intersect in the horizontal line G—8. A line 7 is drawn through a selected point of aim $T_p$ on the target, lying in slant plane 4, and perpendicular to the line of aim from point G to point $T_p$. This line is not, in general, horizontal. Let $\psi$ equal the angle between line 7 and a horizontal line through point 3 lying in the vertical plane through line 7. This angle $\psi$ is, obviously, the apparent angle of climb or dive of the incoming or outgoing target. It is desired to find the relation between the rate of change of the angle $\psi$ and the gun rates and position in elevation and azimuth.

Figure 2:
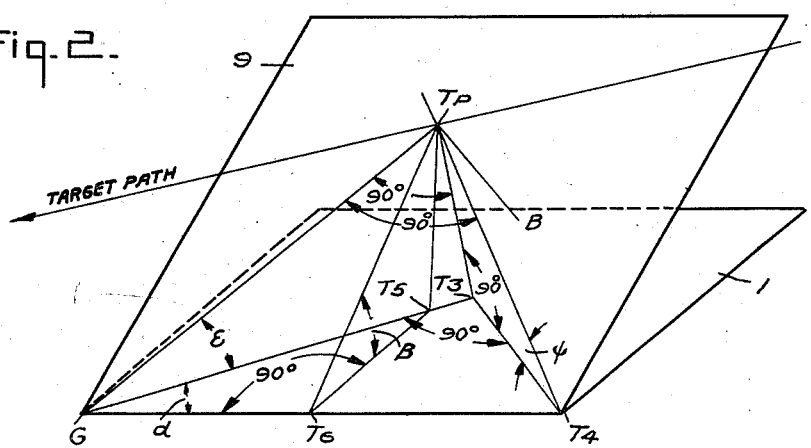
Figure 2 is a perspective view used to illustrate the derivation of the relation between the rate of change of the apparent angle of climb or dive, the gun azimuth rate and the angle of elevation of the gun.

Referring to Figure 2, 1 represents the horizontal plane through the gun, and 9 the slant plane through the target and a line $GT_4$ having any known azimuth, such as N—S.

The slant plane 9 contains the line $GT_p$ connecting the gun and target position. A vertical plane passed through $GT_p$, intersects plane 1 in the line $GT_5T_3$. The angle $T_3GT_p$ then represents the angle of gun elevation and will be identified as $\epsilon$. Through $T_p$ a plane $T_pT_3T_4$ is passed perpendicular to line $GT_p$. This plane intersects slant plane 9 in the line $T_pT_4$, and plane 1 in the line $T_3T_4$. The angle $T_pT_4T_3$ then equals $\psi$, as explained in connection with Figure 1. The angle of train of the gun may be measured by $T_4GT_3$. This angle will be identified as $\alpha$. Since plane $T_4T_3T_p$ was constructed perpendicular to $GT_p$, the angle $GT_pT_4$ is a right angle, as are the angles $GT_3T_4$, $T_pT_3T_4$, and $GT_pT_3$.

A vertical plane is passed through point $T_p$ perpendicular to line $GT_4$. The trace of this plane on plane 1, is $T_5T_6$ and its trace on slant plane 9 is $T_pT_6$. By construction, angle $GT_6T_5$ is 90° and, since this plane is always perpendicular to line $GT_4$, the angle $T_pT_6T_5$, hereinafter identified as $\beta$, remains constant.

The triangle $GT_6T_5$ is similar to the triangle $GT_3T_4$ since they each have a right angle and an angle in common other than said right angle. Therefore, $$\frac{T_3T_4}{GT_3}=\frac{T_5T_6}{GT_6} \quad \text{or} \quad \frac{T_3T_4}{T_5T_6}=\frac{GT_3}{GT_6} \qquad (1)$$

For a like reason, the triangle $GT_pT_4$ is similar to the triangle $GT_pT_6$ and $$\frac{T_4T_p}{GT_p}=\frac{T_6T_p}{GT_6} \quad \text{or} \quad \frac{T_4T_p}{T_6T_p}=\frac{GT_p}{GT_6} \qquad (2)$$

Now, $$\cos\psi = T_3T_4/T_4T_p \qquad (3)$$

From (1)

$$T_3T_4 = \frac{T_5T_6 \cdot GT_3}{GT_6} \qquad (4)$$

From (2)

$$T_4T_p = \frac{T_6T_p \cdot GT_p}{GT_6} \qquad (5)$$

Substituting (4) and (5) in (3), $$\cos\psi = \frac{T_5T_6}{T_6T_p} \times \frac{GT_3}{GT_p} = \frac{T_5T_6/T_6T_p}{GT_p/GT_3}$$

Since $T_5T_6/T_6T_p = \cos\beta$ and $GT_p/GT_3 = \cos\epsilon$, $$\cos\psi = \frac{\cos\beta}{\cos\epsilon} \quad \text{or} \quad \cos\psi\cos\epsilon = \cos\beta$$

Cos $\beta$ is constant, being always measured in a vertical plane through the target perpendicular to its horizontal path.
Therefore, $$d/dt\,(\cos\psi\cos\epsilon)=0$$

Differentiating $$-\sin\psi\cos\epsilon\,d\psi - \cos\psi\sin\epsilon\,d\epsilon = 0 \qquad (7)$$

or $$d\psi = \frac{-\sin\epsilon\,d\epsilon}{\tan\psi\cos\epsilon} \qquad (8)$$

Figure 3:
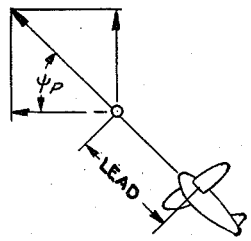
Figure 3 is a schematic view supplemental to Figure 2, illustrating the relation between the rate of change of the apparent angle of climb or dive of the target and the gun azimuth and elevation rates.

From Figure 3 it will be noted that $$\tan\psi = d\epsilon/d\alpha\,\cos\epsilon \qquad (9)$$

Substituting the value of (9) in (8)

$$d\psi = -\sin\epsilon\,d\alpha \qquad (10)$$

In other words, the rate of change of the apparent angle of climb or dive of the target is equal to the product of the sine of the angle of gun elevation and the negative rate of movement of the gun in azimuth.

Figures 4 and 5 show a ball type integrator capable of materializing Equation 10. A gear 10 is rotatably mounted upon any convenient base 20 and is driven by a pinion 11 and a flexible shaft 12, equally and oppositely to angular movement of the gun in azimuth. A sphere 14 is fixed to a shaft 15 defining a polar axis of said sphere. This shaft extends centrally and axially through a bail 13 and is fixed in gear 10. Bail 13 is secured against rotation relatively to support 44' by a bracket 45.

Yoke 13 defines an axis 18 that forms an equatorial diameter of sphere 14, normal to the axis of rotation of gear 10. A second yoke or bail 16 surrounds sphere 14 and is pivoted by trunnions 46 on yoke 13 for angular movement about axis 18. The outer portion of yoke 16 has upwardly-extending projections 21 and 22 shaped to pivotally mount a wheel 17. This wheel may conveniently be of the same diameter as sphere 14, and the dimensions are such that the periphery of wheel 17 is in rolling contact with the surface of sphere 14.

Figures 4, 5 and 6 show a satisfactory method of rotatably mounting wheel 17. From Figure 4 it will be noted that projections 21 and 22 are slotted as at 23, Figure 6, to slidably receive the ends of shaft 24 upon which wheel 17 is fixed. An adjusting bracket 26 is attached to the upper end of projection 22, as by means of screws 27 to form therewith a continuation of slot 23. A bearing block 25 is shaped to fit over the top surface of shaft 24. This block is guided for vertical sliding along slot 23, by lugs 28 slidably fitting vertical channels formed in the portion of projection 22 forming slot 23. A pressure block 29 is slidably mounted in slot 23, similarly to block 25. Blocks 25 and 29 are urged apart by a coil spring 30. An adjusting screw 31 is threaded into bracket 26, so that its end bears upon block 29. Figure 6 shows a normal position of the parts and it will be noted that, with wheel 17 in contact with sphere 14, a slight clearance exists between the bottom of slot 23 and shaft 24. This clearance is shown somewhat exaggerated in Figure 6, for the sake of clearness and, in actual practice would be on the order of a few thousandths of an inch. It will be understood that projection 21 mounts a bearing for shaft 24 that is a duplicate of the one just described and shown at Figure 6. Thus, wheel 17 is at all times firmly urged into contact with sphere 14 so as to roll thereon substantially without slippage when yoke 16 is pivoted about axis 18 to a position such that the point of contact between wheel 17 and sphere 14 is removed from the point of intersection of the axis of shaft 15 with the sphere.

Projection 21 may carry a bracket 32, secured thereto by screws 33, and providing for a connection 35 for the sheathing of a flexible shaft 34 so that rotation of wheel 17 effects a corresponding rotation of the center or core of flexible shaft 34.

Rotation of yoke or bail 16 about axis 18, is effected by the rotation of a pinion 36 rotatably carried in a bearing formed at the lower end of an extension 37 of bail 16 and in mesh with a gear segment 38 fixed to bail 13 concentric of axis 18. Segment 38 and bracket 32 may act to place the bail 16 in substantial balance about the axis 18. Pinion 36 is connected for rotation by a flexible shaft 39 having a coupling 40 for connecting the sheathing of shaft 39 to extension 37. Thus, on rotation of pinion 36, bail 16 is rotated about the axis 18. The angular extent of segment 38 is sufficient to provide for a little more than 90° of rotation of bail 16 so that, for example, shaft 24 may rotate from a substantially horizontal position to a substantially vertical one.

If desired, counterweights 41 and 41' may be mounted upon bolts 42 and 43 carried respectively by extensions 37 and 44 of bail 16. In this way, the bail and parts carried thereby may be substantially balanced about axis 18 to thereby assure smooth and accurate operation.

The model just described is intended for "on carriage" mounting. That is, support 44' is a part of, or rigidly secured to, the gun carriage with yoke 13 so positioned that axis 18 is at all times parallel to the gun trunnions. Flexible shaft 12 is, then, connected to be driven by the training mechanism of the gun so that sphere 14 is rotated equally and oppositely to the movement of the gun in train. In this manner, the sphere is fixed against rotation relatively to the cardinal directions. Flexible shaft 39 is connected to be operated by the elevating mechanism of the gun, so that, for example, the axis of shaft 24 is maintained parallel to the axis of the gun bore. As previously explained, flexible shaft 34 is connected in 1:1 relation with the sighting reticle positioned in the line of sight of the sighting device and rotatable in a plane perpendicular to said line of sight. Thus wheel 17 and the aforesaid reticle are rotated proportionally to the rate of movement of the gun in azimuth, multiplied by the sine of the angle of gun elevation. The negative sign in the right hand side of Equation 10 indicates that the rotation applied to sphere 14 is opposite to the training movement of the gun.

Figure 8 shows the manner in which the instrument of Figures 4 and 5 may be associated with a gun. The gun platform 50 is supported upon base 49 for rotation about a central vertical axis defined by pivot 51. Parallel supports 52 and 53 are fixed to platform 50 and provide bearings for trunnions, one of which is identified at 54. These trunnions project from gun cradle 48 and define a normally horizontal elevation axis for barrel 47. Training of the gun is effected by turning of a handwheel 55 connected through shaft 56, gearing 57, shaft 58, with a pinion 59. Pinion 59 is in mesh with a fixed ring gear 60, only a small portion of which is shown.

A bracket 61 is attached to support 53 and carries the resolver unit of Figures 4 and 5, previously described. It is therefore sufficient merely to identify gear 10, sphere 14, yoke 16, wheel 17, bracket 65, and flexible shafts 12, 34 and 39.

Flexible shaft 12 is connected to be driven by a pinion 62 attached to shaft 58 and in mesh with a reversing idler 63. This idler meshes with a pinion 64 directly connected to the core of shaft 12. The connections and gear ratios are such that the sphere is rotated relatively to the gun, equally and oppositely to the gun's rotation. In other words, the sphere is maintained angularly fixed in azimuth. For ease in understanding, Figure 8 shows axis 18 coincident with the axis of trunnions 54. This position is not essential. In fact, the axes of shaft 15, trunnions 46 and shaft 24, may have any angular relation relatively to the train and elevation axes of the gun, so long as their relation to each other is as shown at Figures 4 and 5.

Elevation of the gun 47 is effected by rotation of handwheel 65, connected by reduction gearing, not shown, to drive a shaft 66. This shaft is journaled at one end in support 52 and carries a pinion 67 at its inner end, in mesh with the elevation gear segment 68, secured to the under side of cradle 48, concentric of the axis of trunnions 54, in the manner well known in the art. The flexible shaft 39, has one end connected to shaft 66 to be driven thereby and its other end attached to pinion 36, Figure 5, as previously explained. The gear ratios are such as to cause the yoke 16 to rotate about axis 18 in synchronism with the elevation of the gun and, for simplicity of explanation, it is assumed that the axis of shaft 24 remains parallel to the gun bore.

Rotation of wheel 17 as a result of training of the gun while elevated, is transmitted over flexible shaft 34 to one side of a differential 69 having its center connected to drive a ring gear 70 having reticle 71 mounted diametrically thereof. Gear 70 is shown as rotatably mounted within the casing of a telescope 72. This casing may have a circumferential slot of an extent sufficient to enable engagement between gear 70 and the center of differential 69. The other side of this differential is connected for manual operation by a handwheel 72'. The gear ratios are such that gear 70 and wheel 17 rotate in synchronism. Reticle 71 therefore rotates in accordance with Equation 10 and, after initial adjustment of the reticle by wheel 72', the reticle remains parallel to the apparent path of the target for the assumed conditions of flight of the target.

Figure 9:
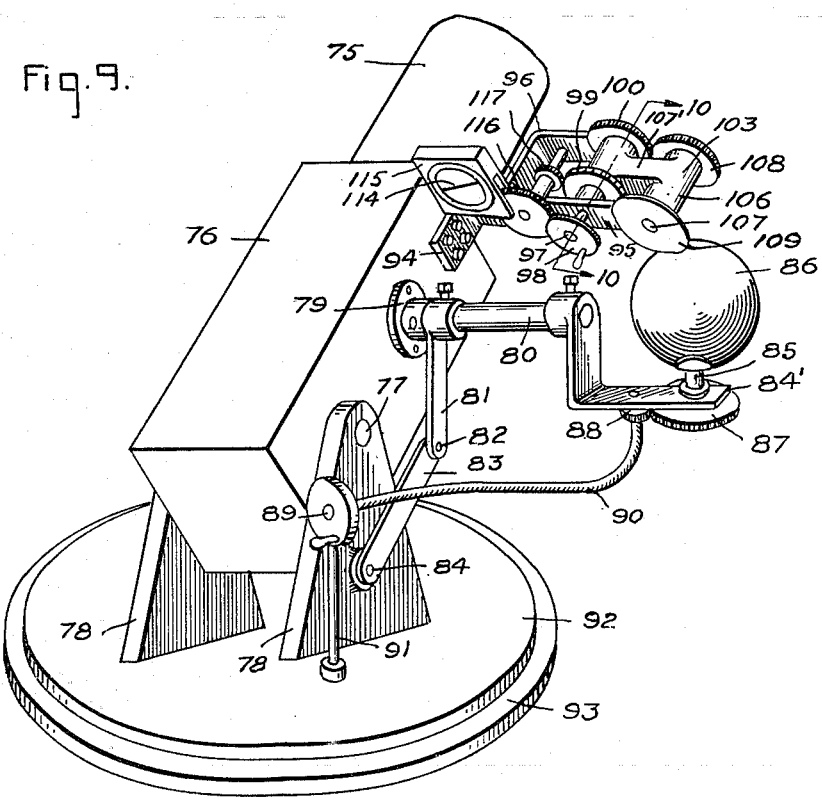
Figure 9 is a perspective view of a modification of the form of the invention of Figures 4 to 8, inclusive.

At Figure 9 I have shown another form of the invention using a ball-type integrator. In this form, the gun 75 and cradle 76 are mounted as before upon trunnions 77 carried in supports 78. A bearing 79 is secured to the side of cradle 76 and journals a shaft 80. A lever arm 81 is fixed to shaft 80 and has its lower end pivoted at 82 to an end of link 83. The other end of link 83 is pivoted at 84 to right-hand support 78 and the dimensions are such that the points of intersection of the axes of trunnion 77, bearing 79 and pivots 82 and 84, with a plane normal to said axes, lie at the vertices of a parallelogram. As the parallelogram side thus defined by 77—84 is vertical, link 81 is maintained in the vertical position.

At its outer end, shaft 80 carries a bracket 84' in which a shaft 85 is journaled. The parallelogram arrangement previously described, acts to maintain the axis of shaft 85 vertical. This axis coincides with the polar diameter of sphere 86. Furthermore, the parts are so dimensioned that the axis of shaft 80, extended, coincides with a diameter of the sphere normal to the aforesaid polar axis. The lower end of shaft 85 has a gear 87 fixed thereto and in mesh with a pinion 88 connected to be driven by gun training handwheel 89, through flexible shaft 90. Training is effected through conventional gearing, not shown, operated by shaft 91 and acting between rotatable platform 92 and fixed base 93. As in the instrument of Figures 4–8, the gear ratios and connections are such as to rotate sphere 86 equally and oppositely to the rotation of platform 92 whereby the sphere remains angularly fixed in azimuth as the gun is trained.

Figure 10:
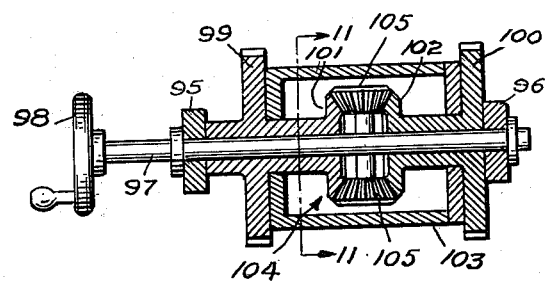
Figure 10 is a sectional view taken on a vertical plane indicated by the line 10—10, Figure 9.

A bracket 94 is fixed to cradle 76 and is formed with spaced parallel arms 95 and 96 whose outer ends form bearings for the support of a rotatable shaft 97 (Fig. 10). A handwheel 98 is fixed to one end of shaft 97. A pair of composite gears 99 and 100 are journaled upon shaft 97. Each has a respective bevel pinion 101 and 102 positioned within a sleeve 103 and forming two sides of a differential, indicated generally by the numeral 104. The center of differential 104 is formed by bevel pinions 105 journaled on a cross shaft carried by shaft 97.

Figure 11:
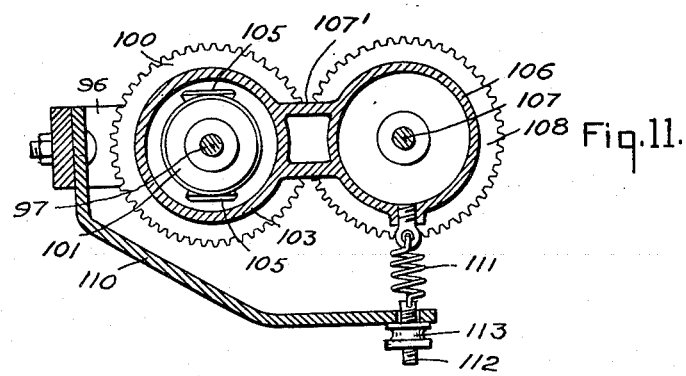
Figure 11 is a section taken upon a plane indicated by the line 11—11, Figure 10.

As best shown at Figure 11, sleeve 103 has a second sleeve 106 secured in parallel offset relation by a connecting portion 107'. Sleeve 106 journals a shaft 107 having a gear 108 attached to one end and planimeter-type wheel 109 attached to the other end. Gear 108 is in mesh with gear 100. Still referring to Figure 11, bracket 94 has an arm 110 attached thereto, with its outer end extending beneath sleeve 106. A coil spring 111 has one end attached to the under side of sleeve 106 and its other end secured to an adjusting screw 112. Thus spring 111 acts to hold wheel 109 in contact with sphere 86 with a force that may be adjusted by operation of nut 113 so that the wheel rolls upon the sphere, substantially without slippage. The parts are so related that wheel 109 at all times lies in, and rotates in, a plane containing the axis of shaft 86. The reticle 114 may be formed upon a transparent plate rotatable within a frame 115 which may conveniently be attached to bracket 94. The plate has a rim, not shown, formed with teeth, meshing with a gear 116. This gear is fixed to a shaft journaled in arm 96 and having a pinion 117 fixed thereto, in mesh with gear 99. The axes of shafts 97 and 107 are parallel to the axis of the gun bore so that the distance of the point of contact of wheel 109 from the polar axis of sphere 86 is proportional to the sine of the angle of gun elevation. The wheel 109 is thus rotated in accordance with Equation 10 and this rotation is imparted to reticle 114 by way of gears 108, 100, 102, 105, 101, 99, 117 and 116 as and for the purpose fully explained in connection with Figures 4 to 8, inclusive.

Figure 12:
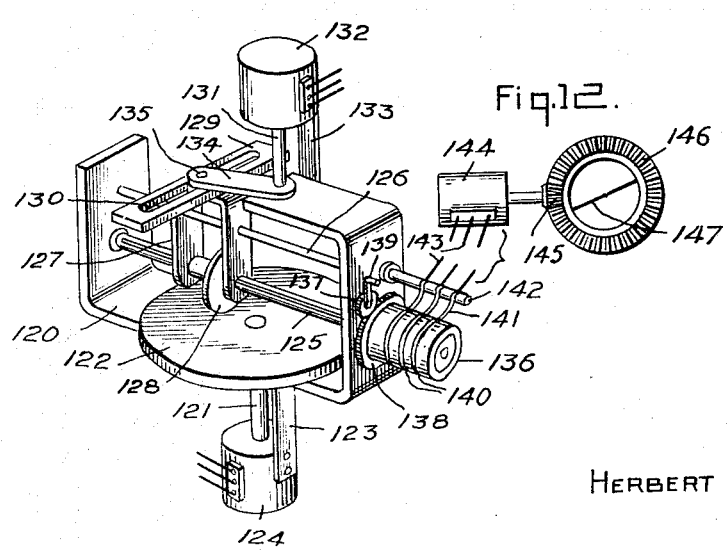
Figure 12 is a perspective view of a second modification adapted more particularly for "off carriage" mounting.

Figure 12 shows a form of the invention suitable for mounting off the gun carriage. Basically, the instrument comprises a frame 120 having a main section in which is journaled a shaft 121 having a disc 122 fixed to its upper end. A bracket 123 depends from frame 120 and carries a repeater 124 such as a conventional "Selsyn" or "Autosyn" having its rotor connected with shaft 121. Repeater 124 is electrically connected for control by a transmitter at the gun (not shown). This transmitter is so driven that disc 122 is rotated in synchronism with movement of the gun in train.

A splined shaft 125 is journaled in the parallel uprights of frame 120, on an axis parallel to disc 122. A guide rod 126 is also mounted in these uprights, parallel to shaft 125. A slide 127 has parallel depending arms apertured to receive shaft 125 and rod 126. A driven wheel 128 slidably fits shaft 125, for rotation therewith and fits snugly between the arms of slide 127. The wheel 128 is thus guided for movement radially of, and in contact with, disc 122.

Slide 127 has a bar 129 fixed thereto. This bar is parallel to disc 122 and has a slot 130 at right angles to the axis of shaft 125. A repeater 132 is mounted upon a bracket 133 and has its rotor attached to one end of a shaft 131. This shaft may conveniently be co-axial of shaft 121. A lever 134 is attached to the lower end of shaft 131 and has a pin 135 at its outer end. This pin slidably fits slot 130 and its radial distance from the axis of shaft 131 is such as to move wheel 128 adjacent the rim of disc 122, when lever 134 is parallel with shaft 125. Thus, wheel 128 is displaced from the center of disc 122 by a distance proportional to the sine of the angle of rotation of lever 134 from an initial position perpendicular to shaft 125. Rotation of lever 134 is effected by repeater motor 132 under the control of a transmitter, not shown. It will be understood, however, that this transmitter is positively driven by the gun elevating mechanism so that lever 134 rotates in synchronism with movement of the gun in elevation. In short, when the quadrant elevation of the gun is zero, lever 134 will be perpendicular to shaft 125 and wheel 128 will be positioned at the center of disc 122. When quadrant elevation is 90° lever 134 is parallel with shaft 125 and wheel 128 is driven by disc 122 at maximum speed ratio. Thus it will be clear that shaft 125 is driven at a speed proportional to the product of the gun azimuth rate and the sine of the angle of gun elevation.

Shaft 125 is connected to the rotor of a transmitter 136. This transmitter has its casing and stator journaled upon frame 120 for independent rotation about the axis of shaft 125. Manual rotation of the stator may be effected by rotaton of a pinion 137, in mesh with a ring gear 138 affixed to the aforesaid casing. A handle 139 is secured to pinion 138. Electrical connections are made to the transmitter by slip rings 140 and brushes 141, carried by an insulating rod 142. Conductors 143 lead from brushes 141 to a repeater 144 whose shaft has a pinion 145 in mesh with a ring gear 146. A sighting reticle 147 is mounted diametrically on gear 146. This reticle and gear may be interposed in a line of sight device, such as a telescope, in the manner described in connection with Figures 8 and 9. Such a sighting device may be directly carried by the gun or its cradle. Alternatively the sight of the species of Figure 12, may be that of a director remote from the gun. In all cases, the angular movement of the reticle may be conveyed by mechanical or electrical repeater means to a director and there utilized as one factor in determining the angle by which the gun should lead the line of sight in order effectively to engage the moving target. Since obviously, repeater 144 may be actuated either by rotation of the rotor of transmitter 136 relatively to its stator, or by rotation of its stator of 136 relatively to its rotor, initial adjustment of reticle 147 may be effected by turning of handle 139. In this respect the transmitter 136 is the full functional equivalent of the differentials 69 and 104, Figures 8 and 9, respectively.

Thus it will be seen that I have produced an instrument that is relatively simple to construct, while being positive and mathematically accurate in theory and operation. Furthermore, after initial adjustment, and so long as the target maintains a straight course, the operation is automatic and the instrument is correctly adjusted by movements of the gun itself.

While I have shown several forms which my invention may take, modifications and substitutions of equivalents will readily occur to those skilled in the art. Consequently, I do not wish to be limited to the precise details of construction. To the contrary, it is my desire that the foregoing disclosure be taken in an illustrative sense only and to reserve all such changes, alterations, modifications and substitutions as fall within the scope of the subjoined claims.

Having now fully disclosed the invention what I claim and desire to secure by Letters Patent is:

1. The combination with a gun having a sight defining a line of sight to a target said sight having a reticle transversely of and rotatable about said line of sight as an axis, and means responsive to the movement of a gun in elevation and train connected to so rotate said reticle in accordance with the equation $d\psi = -\sin \epsilon\, da$, where $d\psi$ is the rate of reticle rotation, $e$ is the angle of gun elevation, and $da$ is the rate of movement of the gun in train.

2. In combination with a gun mounted for angular movement about mutually normal train and elevation axes, of a sight carried by said gun for movement therewith, said sight having a sighting reticle transversely across and rotatable about the line of sight thereof as an axis, and means responsive to the movements of said gun in train and elevation, and connected to so rotate said reticle at a rate proportional to the rate of movement of the gun in train multiplied by the sine of the angle of gun elevation.

3. In an instrument of the type described, a driving member rotatable about an axis, means for so rotating said member at a rate proportional to the rate of train of a gun, a wheel in rolling contact with said member, means responsive to the angle of elevation of said gun for moving said wheel relatively to said member to maintain the point of contact of said wheel with said member at a distance from said axis proportional to the sine of the angle of elevation of said gun, a sighting reticle rotatably mounted upon said gun, and a driving connection between said wheel and reticle for rotating the latter.

4. In combination with a sight adapted to establish a line of sight to a target and having a reticle defining a line transversely of and rotatable about said first-mentioned line as an axis, a sphere, a stationary yoke having bearing means defining a first axis diametral of said sphere, a bail journaled in said bearing means for pivotal movement about said first axis, a wheel journaled in said bail for rotation about a second axis normal to said first axis, said wheel having its periphery in contact with said sphere and lying in a plane containing said first axis for all positions of said bail about said first axis, and a driving connection between said wheel and said reticle.

5. In combination with a gun mounted for train and elevation about mutually normal axes and having a line of sight device including a reticle defining a line transversely of and rotatable about said line of sight as an axis, a sphere, a yoke, means mounting said sphere and yoke for relative rotation about a first axis diametral of said sphere, said yoke having bearing means defining a second axis diametral of said sphere and normal to said first axis, a bail journaled in said bearing means for rotation about said second axis, a wheel journaled in said yoke for rotation on an axis normal to said second axis, said wheel lying in a diametral plane of said sphere containing said second axis, and having its periphery in contact with said sphere, and a driving connection between said wheel and reticle.

6. A computing gun sight comprising, a sphere, a yoke, means mounting said sphere and yoke for relative rotation about a first diameter of said sphere, bearing means carried by said yoke and defining an axis coincident with a second diameter of said sphere normal to said first diameter, a bail journaled in said bearing means for pivotal movement about said axis, a wheel having the same diameter as said sphere and journaled in said bail for rotation in a plane containing said second diameter, with its periphery in contact with said sphere, means effecting relative rotation of said yoke and sphere about said first diameter by and proportional to the change in azimuth of a gun, means effecting relative rotation of said yoke and bail about said second diameter by and proportional to change in elevation of said gun, a sight having a reticle rotatable about the line of sight determined by said sight, a differential having one side connected to be driven by said wheel, and a second side connected to rotate said reticle, and manually-operable means connected to drive the third side of said differential, whereby initial manual adjustment of said reticle may be effected.

7. In combination with a gun having a cradle mounted for movement about mutually-normal train and trunnion axes, a shaft pivoted on said cradle on a first axis parallel to said trunnion axis, a bracket secured to said shaft, a sphere journaled on said bracket for rotation about a second axis, said first and second axes being coincident with respective, mutually-normal diameters of said sphere, means connected with said shaft to maintain said second axis in fixed relation with the vertical as said gun is elevated, means responsive to training movement of said gun to maintain said sphere fixed in azimuth about said second axis, a sighting reticle carried by said cradle and extending transversely of and rotatable about a parallel to the bore of said gun, a line wheel carried by said cradle and rotatable in a plane containing said first axis, said wheel being in driven contact with said sphere, and a driving connection between said wheel and reticle whereby the latter is rotated at a rate equal to the rate of train of said gun multiplied by the sine of the angle of gun elevation.

8. In a computing sight for a gun mounted for movement about mutually-normal train and elevation axes, a sphere carried by said gun and rotatable about mutually-normal first and second axes parallel, respectively, to said train and elevation axes, means connected with said sphere to maintain said first axis vertical for all angles of gun elevation and to rotate said sphere about said first axis to maintain a given diameter thereof fixed in azimuth for all angles of train of said gun, a reticle carried by said gun transversely of and rotatable about a line of sight substantially parallel to the bore axis of said gun, and means driven by relative rotation of said gun and sphere for rotating said reticle at a rate proportional to the rate of train of said gun times the sine of the angle of gun elevation.

9. In combination with a gun sight having a reticle defining a line transversely across and rotatable about the line of sight of said sight, a bracket adapted to be fixed with said gun for elevation and train therewith, a pair of connected spaced parallel first and second sleeves, a first shaft journaling said first sleeve in said bracket, a second shaft journaled in said second sleeve, a wheel and a first gear fixed to respective ends of said second shaft, a differential mounted on said first shaft and including second and third gears secured to the respective sides of said differential, said first and second gears intermeshing, a drive from said third gear to said reticle, manually operable means connected to drive the center of said differential through said first shaft, a sphere adapted to be mounted on said gun for rotation about a vertical polar axis, and means urging said second sleeve about the axis of said first shaft to bring said wheel into yielding contact with said sphere, whereby the point of contact of said wheel on said sphere traverses a meridian thereof as the gun is elevated.

10. The combination with a rotatable reticle adapted for mounting within the field of view of a gun sight, a disc rotatable about a first axis, a splined shaft rotatable about a second axis normal to and concurrent with said first axis, a wheel on said shaft for rotation therewith and sliding therealong radially of, and in contact with, said disc, a first repeater motor connected to rotate said disc in response to training movement of a gun, a second repeater motor connected, in response to changes in the angle of elevation of said gun, to move said wheel a radial distance from the center of said disc, proportional to the sine of the angle of gun elevation, a transmitter having a rotatable rotor and a rotatable stator, means connecting said shaft and rotor for conjoint rotation, manually-operable means for rotating said stator, a third repeater connected for actuation in response to relative rotation of said rotor and stator, and a driving connection between said third repeater and said reticle.

11. The combination with a reticle rotatable within the field of view of a line of sight device about the optical axis of said device, first and second aligned shafts, first and second repeaters connected to rotate said shafts, respectively, a disc fixed to said first shaft, a lever fixed to said second shaft, a slide mounted for translation only in one direction radially of said disc and having a slot normal to said one direction, a wheel journaled in said slide on an axis parallel to said one direction and in engagement with said disc, a pin on said lever slidably engaging said slot, an electric telemetric transmitter having a rotatable stator and rotor, a driving connection between said wheel and said rotor, manually-operable means for rotating said stator, and a repeater connected to rotate said reticle in response to relative rotation of said stator and rotor.

12. In combination with a gun mounted for angular movement about mutually normal train and elevation axes, a sight carried by said gun for movement therewith, said sight having a reticle extending transversely across and rotatable about the line of sight of said sight as an axis, rotatable means, means rotating said rotatable means in response to movement of said gun in train, wheel means in driven contact with said rotatable means and responsive to movement of said gun in elevation and to operation of said rotatable means, and a driving connection between wheel means and reticle whereby said reticle is rotated at a rate proportional to the rate of movement of said gun in train multiplied by the sine of the angle of gun elevation.

HERBERT K. WEISS.

REFERENCES CITED

The following references are of record in the file of this patent:

UNITED STATES PATENTS

| Number | Name | Date |
|---|---|---|
| 1,962,590 | Haubroe | June 12, 1934 |
| 2,372,613 | Svoboda | Mar. 27, 1945 |
| 2,396,701 | Holschuh et al. | Mar. 19, 1946 |
| 2,405,383 | Wackett | Aug. 6, 1946 |